United States Patent
Ishizeki

(10) Patent No.: US 7,944,080 B2
(45) Date of Patent: May 17, 2011

(54) CAPACITOR DEVICE AND VEHICULAR POWER SUPPLY DEVICE

(75) Inventor: Seiichi Ishizeki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 290 days.

(21) Appl. No.: 12/169,478

(22) Filed: Jul. 8, 2008

(65) Prior Publication Data
US 2009/0039707 A1    Feb. 12, 2009

(30) Foreign Application Priority Data

Jul. 9, 2007 (JP) .................. 2007-180186

(51) Int. Cl.
*B60L 1/00* (2006.01)
*B60L 3/00* (2006.01)

(52) U.S. Cl. ............................................. 307/9.1
(58) Field of Classification Search .............. 307/10.6, 307/9.1
See application file for complete search history.

(56) References Cited

U.S. PATENT DOCUMENTS
4,553,511 A * 11/1985 Hayakawa et al. ........ 123/179.3

FOREIGN PATENT DOCUMENTS
JP    06-270695 A    9/1994

* cited by examiner

*Primary Examiner* — Jared J Fureman
*Assistant Examiner* — Dru M Parries
(74) *Attorney, Agent, or Firm* — McDermott Will & Emery

(57) ABSTRACT

A capacitor device includes a normally open internal relay provided on an electric wire of a capacitor. The internal relay can be closed by supplying the power from a battery.

17 Claims, 3 Drawing Sheets

CAPACITOR DEVICE AND VEHICULAR POWER SUPPLY DEVICE

CROSS-REFERENCES TO RELATED APPLICATIONS

The disclosure of Japanese Patent Application No. 2007-180186 filed on Jul. 9, 2007 including the specification, drawings and abstract is incorporated herein by reference in its entirety.

BACKGROUND OF THE INVENTION

1. Field of the Invention

The present invention relates to a capacitor device that is used together with a battery, and a vehicular power supply device.

2. Description of the Related Art

In general, in a case where a battery, such as a lead-acid battery, installed in a vehicle such as a gasoline-driven car or a diesel vehicle, is configured to have a large electric capacity so that a large amount of power can be instantaneously output, its installation functionality deteriorates. Capacitors, such as a lithium ion capacitor and an electric double layer capacitor, instantaneously charge and discharge a large amount of power. However, such capacitors have a storage amount lower than that of lead-acid batteries.

Accordingly, a vehicular power supply device (see, for example, Japanese Unexamined Patent Application Publication No. 6-270695) that can instantaneously output a large amount of power by combining a battery and a capacitor without enlarging entire size is known.

In a case where, in a vehicular power supply device of the above type, a battery or the like enters an over discharge state (so-called battery-dead state) due to a vehicle not being used for a long period of time, in general, similarly to a power supply device including a single battery, power is externally supplied to the vehicular power supply device via a booster cable or the like. However, for a power supply device in which both a battery and a capacitor are used, sufficiently careful handling is required since such a power supply has a current inflow amount much larger than that of a power supply device including a single battery.

In addition, in particular, a capacitor is configured to instantaneously charge and discharge a large amount of power. Accordingly, for example, in a case such as when a capacitor that remains charged is mounted to or demounted from the vehicle, sufficiently careful handling is required.

SUMMARY OF THE INVENTION

The present invention has been made in view of the above circumstances. It is an object of the present invention to provide a capacitor device and a vehicular power supply device that facilitate their handling in the case of external charging for over discharge and in the case of a mounting or demounting operation.

According to a first aspect of the present invention, there is provided a capacitor device for a power supply, the capacitor device being used together with a battery. The capacitor device includes a capacitor and a normally open internal relay provided on an electric wire of the capacitor, the normally open internal relay being closed by supplying the power from the battery.

According to a second aspect of the present invention, there is provided a vehicular power supply device including a battery, a capacitor device including a capacitor and a normally open internal relay provided on an electric wire of the capacitor used together with the battery, the normally open internal relay being closed by supplying the power from the battery, and controller controlling opening and closing of the normally open internal relay.

According to a third aspect of the present invention, the vehicular power supply device further may provide a voltage sensor detecting a voltage of the capacitor. The capacitor device is connected so that, when the normally open internal relay is closed, power is supplied from an alternator to the capacitor. When the detected voltage in a case where the normally open internal relay is closed is lower than a voltage applied from the alternator to the capacitor, the controller determines that the normally open internal relay has a problem in being opened.

According to a fourth aspect of the present invention, the controller may determine a charging state of the capacitor on the basis of the detected voltage in a case where the normally open internal relay is opened.

According to a fifth aspect of the present invention, the vehicular power supply device further may provide an adapter being electrically connected to terminals of the capacitor device in a case where the capacitor device is electrically disconnected from the battery and the controller. The adapter forms a discharge circuit of the capacitor in such a manner that the normally open internal relay is closed by a power supplied from the capacitor in a case where the adapter is electrically connected to the terminals of the capacitor device.

According to the present invention, it is possible to facilitate handling of a capacitor device and a power supply in the case of external charging for over discharge and in the case of a mounting or demounting operation.

DESCRIPTION OF THE PREFERRED EMBODIMENTS

Figure 1:
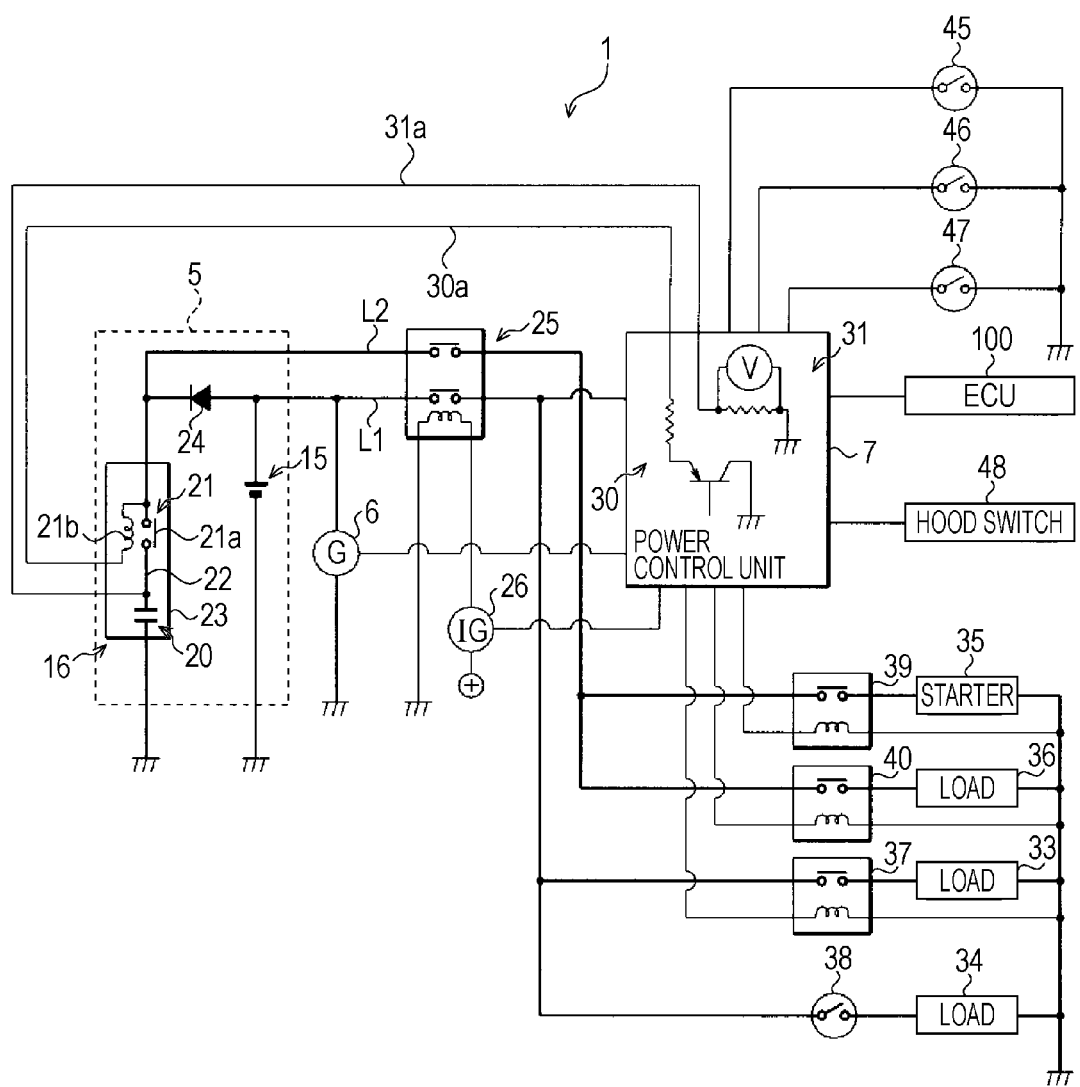
FIG. 1 is a schematic circuit diagram showing a vehicular power supply.
Figure 2:
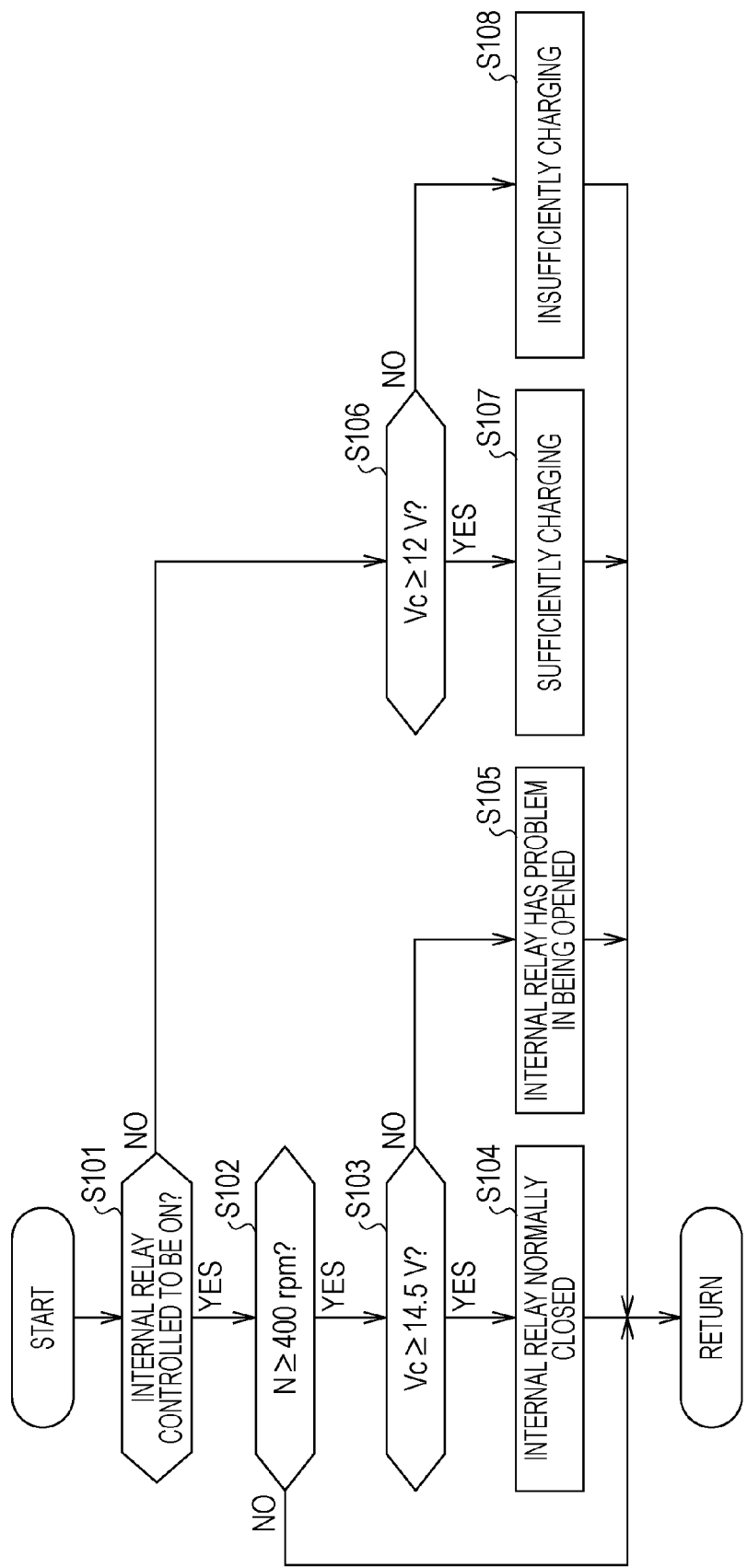
FIG. 2 is a flowchart showing a diagnosis routine of a capacitor device.
Figure 3:
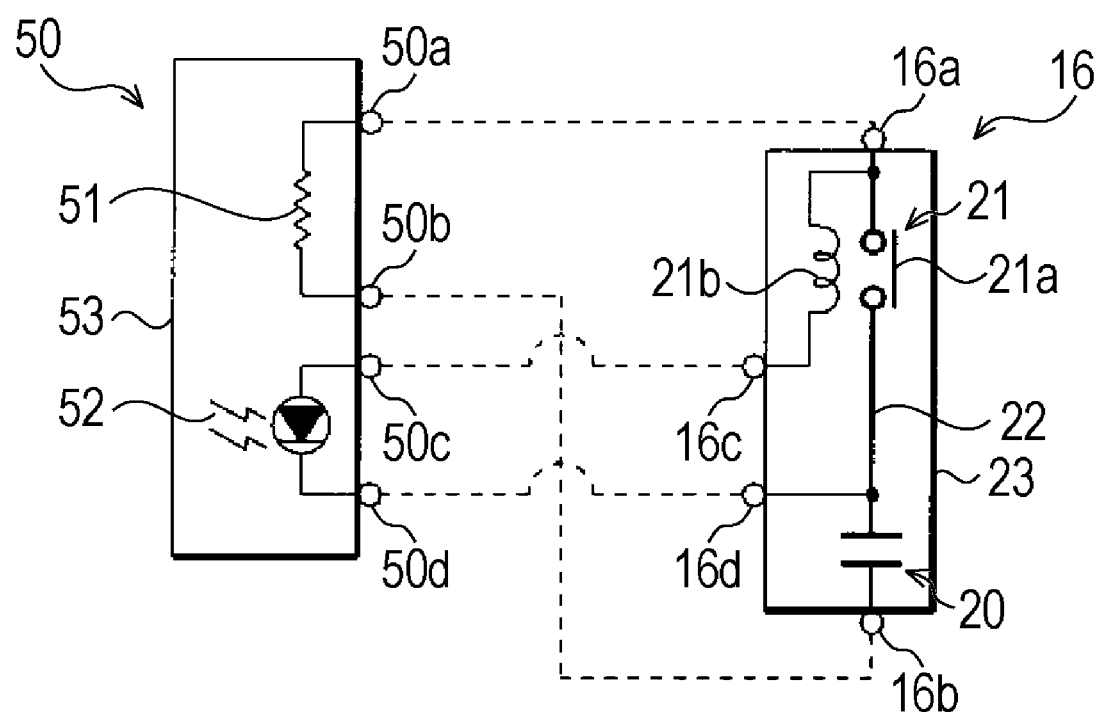
FIG. 3 is a schematic circuit diagram showing a capacitor-diagnosing adapter.

An embodiment of the present invention will be described with reference to the accompanying drawings. The drawings relate to an embodiment of the present invention. FIG. 1 is a schematic circuit diagram showing a vehicular power supply device. FIG. 2 is a flowchart showing a diagnosis routine of a capacitor device. FIG. 3 is a schematic circuit diagram showing a capacitor-diagnosing adapter.

The vehicular power supply device 1 shown in FIG. 1 is preferably installed in a vehicle having an idling stop function that automatically stops an engine when a vehicle is stopped and that restarts the engine in conjunction with a preset driver's driving operation (such as a brake pedal releasing operation or a gas pedal depressing operation). The vehicular power supply device 1 has a main unit including a power section 5 capable of generating an instantaneous large current, an alternator 6 that performs power generation by using a driving force of the engine, and a power control unit 7 that performs feeding control, etc., of the power section 5 and the alternator 6.

In the power section 5, for example, a 12-V battery 15 formed by a lead-acid battery or the like, and a capacitor device 16 are connected in parallel to form a main portion.

In the capacitor device 16, for example, a large-capacitance capacitor 20 formed by an electric double layer capacitor, a lithium capacitor, or the like, and an internal relay 21 provided on an electric wire 22 of the capacitor 20 are accommodated in a housing 23 to form a main portion.

The internal relay 21 is formed by, for example, a mechanical normally open relay in which a contact 21a is opened (off) when an excitation coil 21b is in a non-conduction state. The contact 21a of the internal relay 21 is provided on the electric wire 22 on a side (hereinafter referred to as an "anode side") in which the capacitor 20 is electrically connected to an anode of the battery 15. One end of the excitation coil 21b is electrically connected to the electric wire 22 closer to the anode than the contact 21a, while the other end is electrically connected to a switching element 30 in the power control unit 7 via a signal line 30a. This allows the excitation coil 21b to close (turn on) the contact 21a by conduction from the battery 15 when the switching element 30 is controlled to be on. As described above, the internal relay 21 is formed by a normally open relay that can be closed by power directly supplied from the battery 15.

In addition, a voltage monitoring signal line 31a is electrically connected between the capacitor 20 and the contact 21a, and the voltage monitoring signal line 31a is electrically connected to a voltage sensor 31 provided in the power control unit 7.

In this embodiment, the power section 5 includes a diode 24 between the capacitor device 16 and the battery 15. The diode 24 inhibits feeding from the capacitor device 16 to the battery 15. A first power supply wire L1 capable of outputting a current (e.g., a maximum current of 500 A) from the battery 15 is electrically connected to the anode of the diode 24. A second power supply wire L2 capable of outputting a large current (e.g., a maximum current of 1200 A) from the battery 15 and the capacitor 20 is electrically connected to the cathode of the diode 24.

The power control unit 7 is electrically connected as an electric load that does not need a large current to the first power supply wire L1, and an electric load 33 such as a headlight is electrically connected to the first power supply wire L1 via a relay 37. In addition, an electric load 34 such as an electronic side mirror is electrically connected to the first power supply wire L1 via a switch 38.

In addition, an electric load (engine starter) 35 that needs an instantaneous large current when the engine is started is electrically connected to the second power supply wire L2, and an electric load 36 such as a seat heater or a rear window defogger is electrically connected to the second power supply wire L2 via a relay 40.

An ignition relay 25 is provided in the middle of the first and second power supply wires L1 and L2. The alternator 6 is electrically connected to the first power supply wire L1 closer to the power section 5 than the ignition relay 25.

When an ignition switch 26 is turned on, the ignition relay 25 is excited to electrically connect the side of the power section 5 and the alternator 6, and each electric load. The excitation of the ignition relay 25 is configured to continue until the ignition switch 26 is turned off. In addition, information that indicates that the ignition switch 26 has been turned on, that is, a key inserted into the ignition switch 26 is at an on-position, is output from the ignition switch 26 to the power control unit 7.

When the alternator 6 is driven by the engine to initiate power generation, the alternator 6 supplies each electric load with generated power via the first and second power supply wires L1 and L2. In a case where the generated power is larger than the power consumption of each electric load, the alternator 6 charges the battery 15, and charges the capacitor 20 via the diode 24. A regulator control circuit (not shown) of the alternator 6 outputs, to the power control unit 7, an information signal indicating that the engine is being run.

Switches 45 to 47 for operating the electric loads 33, 35, and 36 are connected to the power control unit 7. Here, for example, the switch 45 is a headlight switch corresponding to the electric load 33. The switch 46 is a seat heater switch or rear window defogger switch corresponding to the electric load 36. The switch 47 is an engine start button for operating the electric load (engine starter) 35 or a detection switch that detects whether the key inserted into the ignition switch is at an engine start position.

The power control unit 7 controls operations of the electric loads 33, 35, and 36 in accordance with operation states of the switches 45 to 47. In other words, the power control unit 7 does not excite (controls) the relays 37, 39, and 40 (to be off) in accordance with the switches 45 to 47, which have been turned off, and excites (controls) the relays 37, 39, and 40 (to be on) in accordance with the switches 45 to 47, which have been turned on. The excited relays 37, 39, and 40 electrically connect the power section 5 (and the alternator 6) and the side of the electric loads 33, 35, and 36, and supply power to the electric loads 33, 35, and 36. The power control unit 7 is configured to receive various control signals of the engine from an engine control unit (ECU) 100. When the power control unit 7 receives, from the engine control unit 100, a signal that instructs the engine, which has been automatically stopped by idling stop control, to restart, the power control unit 7 controls the relay 39 to be on, and operates the electric load 35 (engine starter) 35 until it is determined that the engine has successfully performed combustion. In this embodiment, even if the switch 46 has been turned on, the power control unit 7 controls the relay 40 to be off while the relay 39 is controlled to be on. The electric load 34 is directly operated by the switch 38.

The power control unit 7 uses the switching element 30 to control switching of the internal relay 21 in the capacitor device 16. In this embodiment, for example, when the relay 39 or 40 is controlled to be on, the power control unit 7 turns on the switching element 30 to control the internal relay 21 to be closed (on). Accordingly, a large current obtained by adding a current from the capacitor 20 to a current from the battery 15 (and the alternator 6) is supplied to the electric load 35 or 36 via the second power supply wire L2. When the power control unit 7 has determined that a charging amount of the capacitor 20 decreases, the power control unit 7 turns on the switching element 30 and controls the internal relay 21 to be closed (on). This charges the capacitor 20.

Here, for example, a hood switch 48 for detecting an open/closed state of an engine hood is connected to the power control unit 7. In a case where the relay 39 or 40 is controlled to be on, or, even if the charging amount of the capacitor 20 decreases, when it is determined that the engine hood is closed, the internal relay 21 is controlled to be opened on the basis of the standpoint of user protection.

The power control unit 7 also diagnoses the capacitor device 16 on the basis of a voltage Vc detected by the voltage sensor 31. In this embodiment, specifically, the power control unit 7 determines whether the internal relay 21 has a problem in being opened, and determines a charging state of the capacitor 20.

A diagnosis of the capacitor device 16 is performed in accordance with, for example, the flowchart of the capacitor device diagnosis routine shown in FIG. 2. This routine is repeatedly executed for each predetermined time by the power control unit 7. When the routine starts, in step S101, first, the power control unit 7 determines whether or not the internal relay 21 is being controlled to be on.

If, in step S101, the power control unit 7 has determined that the internal relay 21 is being controlled to be on, the power control unit 7 proceeds to step S102.

If, in step S101, the power control unit 7 has determined that the internal relay 21 is not being controlled to be on, that is, if the power control unit 7 has determined that the internal relay 21 is being controlled to be off, the power control unit 7 proceeds to step S106.

Proceeding from step S101 to step S102, the power control unit 7 determines whether or not the number N of revolutions of the engine is equal to or greater than 400 rpm, and determines whether or not the number N of revolutions is sufficient for power generation of the alternator 6.

If, in step S102, the power control unit 7 has determined that the number N of revolution is less than 400 rpm and has determined that the number N of revolutions is insufficient for power generation of the alternator 6, the power control unit 7 directly exits the routine.

If, in step S102, the power control unit 7 has determined that the number N of revolutions is equal to or greater than 400 rpm and has determined that the number N of revolutions is sufficient for power generation of the alternator 6, the power control unit 7 proceeds to step S103. In step S103, the power control unit 7 determines whether or not the voltage Vc currently detected by the voltage sensor 31 is equal to or greater than 14.5 V, which is a voltage generated by, for example, the alternator 6.

If, in step S103, the power control unit 7 has determined that the voltage Vc is equal to or greater than 14.5 V, the power control unit 7 proceeds to step S104. In step S104, the power control unit 7 determines that the voltage generated by the alternator 6 is applied to the capacitor 20, and that the internal relay 21 is normally closed. After that, the power control unit 7 exits the routine.

If, in step S103, the power control unit 7 has determined that the voltage Vc is less than 14.5 V, the power control unit 7 proceeds to step S105. In step S105, the power control unit 7 determines that the voltage generated by the alternator 6 is not applied from the alternator 6 to the capacitor 20, and that there is a high possibility that the internal relay 21 has a problem in being opened. After that, power control unit 7 exits the routine.

Proceeding from step S101 to step S106, the power control unit 7 determines whether or not the voltage Vc currently detected by the voltage sensor 31 is equal to or greater than, for example, 12 V.

If, in step S106, the power control unit 7 has determined that the voltage Vc is equal to or greater than 12 V, the power control unit 7 proceeds to step S107. In step S107, the power control unit 7 determines that the capacitor 20 has sufficient charge (charging is sufficient). After that, the power control unit 7 exits the routine.

Alternatively, if, in step S106, the power control unit 7 has determined that the voltage Vc is less than 12 V, the power control unit 7 proceeds to step S108. In step S108, the power control unit 7 determines that the capacitor 20 has sufficient charge (charging is insufficient). After that, the power control unit 7 exits the routine.

According to this embodiment, the capacitor device 16 includes the normally open internal relay 21 provided on the electric wire 22 of the capacitor 20, and the internal relay 21 can be opened and closed by power supplied from the battery 15. Thus, in cases such as when the battery 15 has over discharge, and when an electric connection to the battery 15 is disconnected, the internal relay 21 can be appropriately opened without depending on control of the power control unit 7 or the like. Therefore, in a case where external charging is performed for over discharge or the like, or in a case where mounting to or demounting from the vehicle is performed, handling of the capacitor device 16 is facilitated. In other words, for example, in a case where, when the battery 15 or the like has over discharge or the like, a booster cable or the like is connected so that power is externally supplied to the vehicular power supply 1, a current that flows at the moment of connecting the booster cable or the like can be controlled to be a relatively small current according to the capacity of only the battery 15. In addition, in a case such as when the capacitor device 16 is mounted to or demounted from the vehicle, the internal relay 21 can be appropriately opened at the time the capacitor device 16 is electrically disconnected from the battery 15.

In a case where the internal relay 21 is provided in the power section 5, determination of whether the internal relay 21 has a problem in being opened can be easily realized by a simple configuration in which, when the internal relay 21 is controlled to be closed, the voltage Vc of the capacitor 20 is only monitored. In addition, also when the internal relay 21 is controlled to be opened, by monitoring the voltage Vc of the capacitor 20, a charging state of the capacitor 20 can be determined.

Meanwhile, the capacitor 20 provided in the capacitor device 16 has a large capacitance. Thus, when the capacitor device 16 is exchanged or repaired, even if the internal relay 21 is opened, it is preferable that charge in the capacitor 20 be appropriately dispersed. Accordingly, for example, the adapter device 50 shown in FIG. 3 is removably connected to the capacitor device 16, which is demounted from the vehicle.

The adapter device 50 has, for example, a first terminal 50a that is electrically connected to a positive terminal 16a of the capacitor 20, a second terminal 50b that is electrically connected to a negative electrode 16b of the capacitor 20, a third terminal 50c that is electrically connected to a control terminal 16c of the capacitor 20, and a fourth terminal 50d that is electrically connected to a voltage monitoring terminal 16d of the capacitor 20.

In a housing of the adapter device 50, the first terminal 50a and the second terminal 50b are electrically connected to each other by a resistor 51, and the third electrode 50c and the fourth electrode 50d are electrically connected by a light-emitting diode 52.

When the first to fourth terminals 50a to 50d of the adapter device 50 are electrically connected to the terminals 16a to 16d of the capacitor device 16, power charged in the capacitor 20 closes the internal relay 21 to form a discharge circuit of the capacitor 20. In other words, the adapter device 50 electrically connects the positive terminal 16a and negative terminal 16b of the capacitor device 16 via the resistor 51, and electrically connects the control terminal 16c and voltage monitoring terminal 16d of the capacitor device 16 via the light-emitting diode 52. This causes the capacitor 20 to close the internal relay 21 when charge remains in the capacitor 20. The capacitor 20 causes the resistor 51 to consume the charge. At this time, the light-emitting diode 52 can light. By visually recognizing a lighting state of the light-emitting diode 52, a user can determine whether or not the charge remains in the capacitor 20.

What is claimed is:

1. A vehicular power supply device comprising:
a battery;
a capacitor device including a capacitor and a normally open internal relay provided on an electric wire of the capacitor used together with the battery, the normally open internal relay being closed by supplying a power from the battery;

a controller controlling opening and closing of the normally open internal relay; and a voltage sensor detecting a voltage of the capacitor;

wherein the capacitor device is connected so that, when the normally open internal relay is closed, power is supplied from an alternator to the capacitor, and wherein, when the detected voltage in a case where the normally open internal relay is closed is lower than a voltage applied from the alternator to the capacitor, the controller determines that the normally open internal relay has a problem in being opened.

2. The vehicular power supply device according to claim 1, wherein the controller determines a charging state of the capacitor on the basis of the detected voltage in a case where the normally open internal relay is opened.

3. The vehicular power supply device according to claim 1, further comprising an adapter being electrically connected to terminals of the capacitor device in a case where the capacitor device is electrically disconnected from the battery and the controller, the adapter forms a discharge circuit of the capacitor in such a manner that the normally open internal relay is closed by a power supplied from the capacitor in a case where the adapter is electrically connected to the terminals of the capacitor device.

4. The vehicular power supply device according to claim 2, further comprising an adapter being electrically connected to terminals of the capacitor device in a case where the capacitor device is electrically disconnected from the battery and the controller, the adapter forms a discharge circuit of the capacitor in such a manner that the normally open internal relay is closed by a power supplied from the capacitor in a case where the adapter is electrically connected to the terminals of the capacitor device.

5. A vehicular power supply device comprising:

a battery;

a capacitor device including a capacitor and a normally open internal relay provided on an electric wire of the capacitor used together with the battery, the normally open internal relay being closed by supplying a power from the battery;

a controller controlling opening and closing of the normally open internal relay; and an adapter being electrically connected to terminals of the capacitor device in a case where the capacitor device is electrically disconnected from the battery and the controller, the adapter forms a discharge circuit of the capacitor in such a manner that the normally open internal relay is closed by a power supplied from the capacitor in a case where the adapter is electrically connected to the terminals of the capacitor device.

6. A vehicular power supply device comprising:

a battery;

a capacitor device including a capacitor and a normally open internal relay electrically connected to the capacitor used together with the battery, the normally open internal relay being closed by supplying a power from the battery;

a diode provided between the normally open internal relay and the battery, the diode inhibits feeding from the capacitor to the battery; and a controller controlling opening and closing of the normally open internal relay.

7. The vehicular power supply device according to claim 6, further comprising:

a first power supply wire electrically connected to the anode of the diode, the first power supply wire being capable of feeding from the battery and not feeding from the capacitor; and a second power supply wire electrically connected to the cathode of the diode, the second power supply wire being capable of feeding from the battery and feeding from the capacitor via the diode.

8. The vehicular power supply device according to claim 6, further comprising:

a first electric load electrically connected to the first power supply; and a second electric load electrically connected to the second power supply, wherein the second electric load needs a larger current than the first electric load.

9. The vehicular power supply device according to claim 8, wherein the first electric load is one of a headlight or an electronic side mirror.

10. The vehicular power supply device according to claim 8, wherein the second electric load is one of an engine starter, a seat heater or a rear window defogger.

11. The vehicular power supply device according to claim 6, wherein the first power supply wire electrically connects to one of a headlight or an electronic side mirror.

12. The vehicular power supply device according to claim 6, wherein the second power supply wire electrically connects to one of an engine starter, a seat heater or a rear window defogger.

13. The vehicular power supply device according to claim 6, wherein the maximum current amount fed from the capacitor is larger than the maximum current amount fed from the battery.

14. The vehicular power supply device according to claim 6, wherein the battery and the capacitor are connected in parallel.

15. The vehicular power supply device according to claim 6, further comprising:

a switching element to control the normally opened relay, the switching element is fed by the battery, and wherein the normally opened relay opens when the battery is over-discharged or the batter is disconnected from the vehicular power supply.

16. A power supply kit comprising:

a capacitor device including a capacitor and a normally open internal relay electrically connected to the capacitor; and an adapter being capable electrically connecting to terminals of the capacitor device, and wherein the adapter forms a discharge circuit of the capacitor in such a manner that the normally open internal relay is closed by a power supplied from the capacitor in a case where the adapter is electrically connected to the terminals of the capacitor device.

17. The power supply kit according to claim 16, wherein the adaptor comprises a indicator capable electrically connecting to the capacitor device, the indicator indicates that charge in the capacitor consumes.

* * * * *